J. H. STORTZ.
SPEED SELECTOR.
APPLICATION FILED DEC. 2, 1913.
1,209,352.
Patented Dec. 19, 1916.
3 SHEETS—SHEET 1.
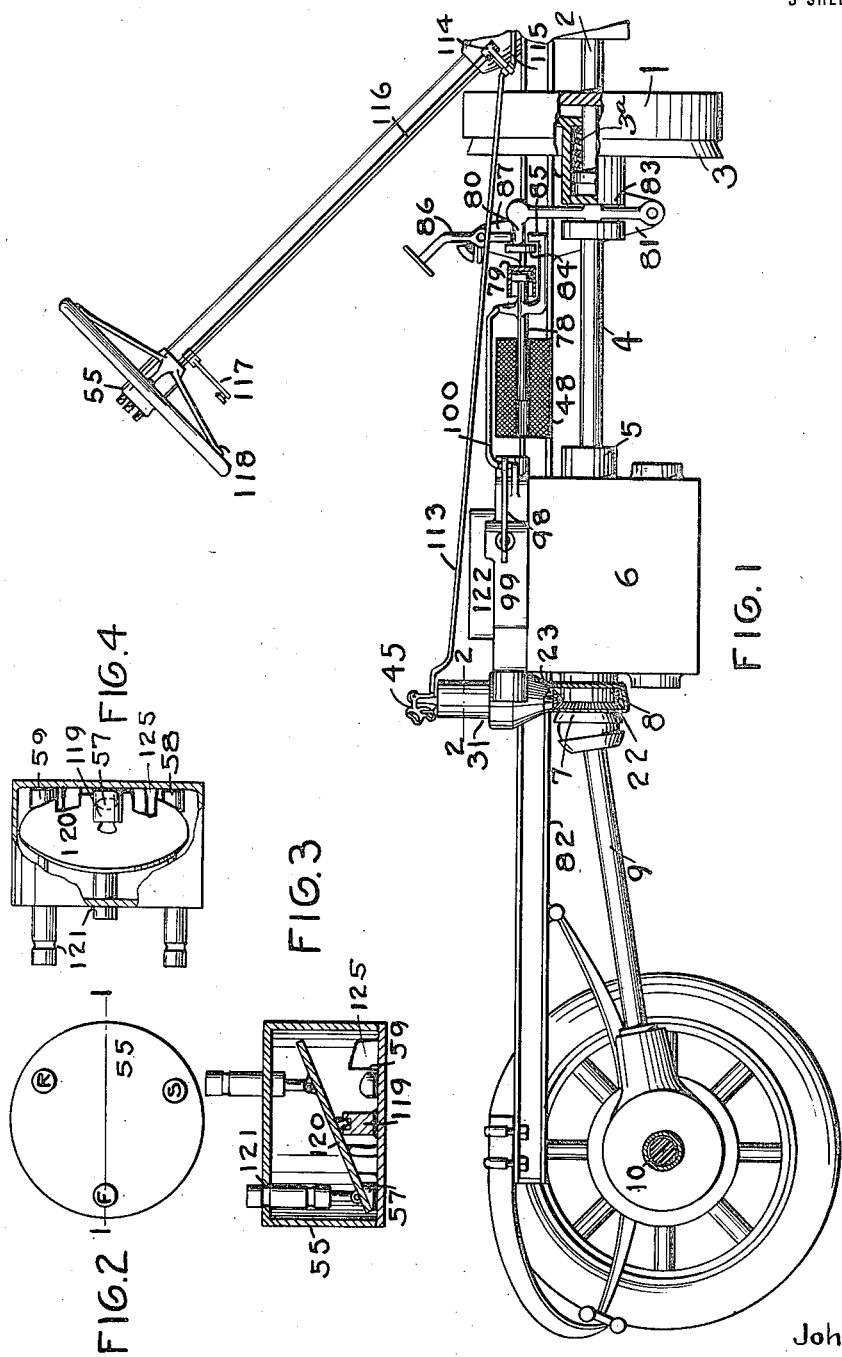
Inventor
John H. Stortz.
BY
J. S. Presmar
Attorney

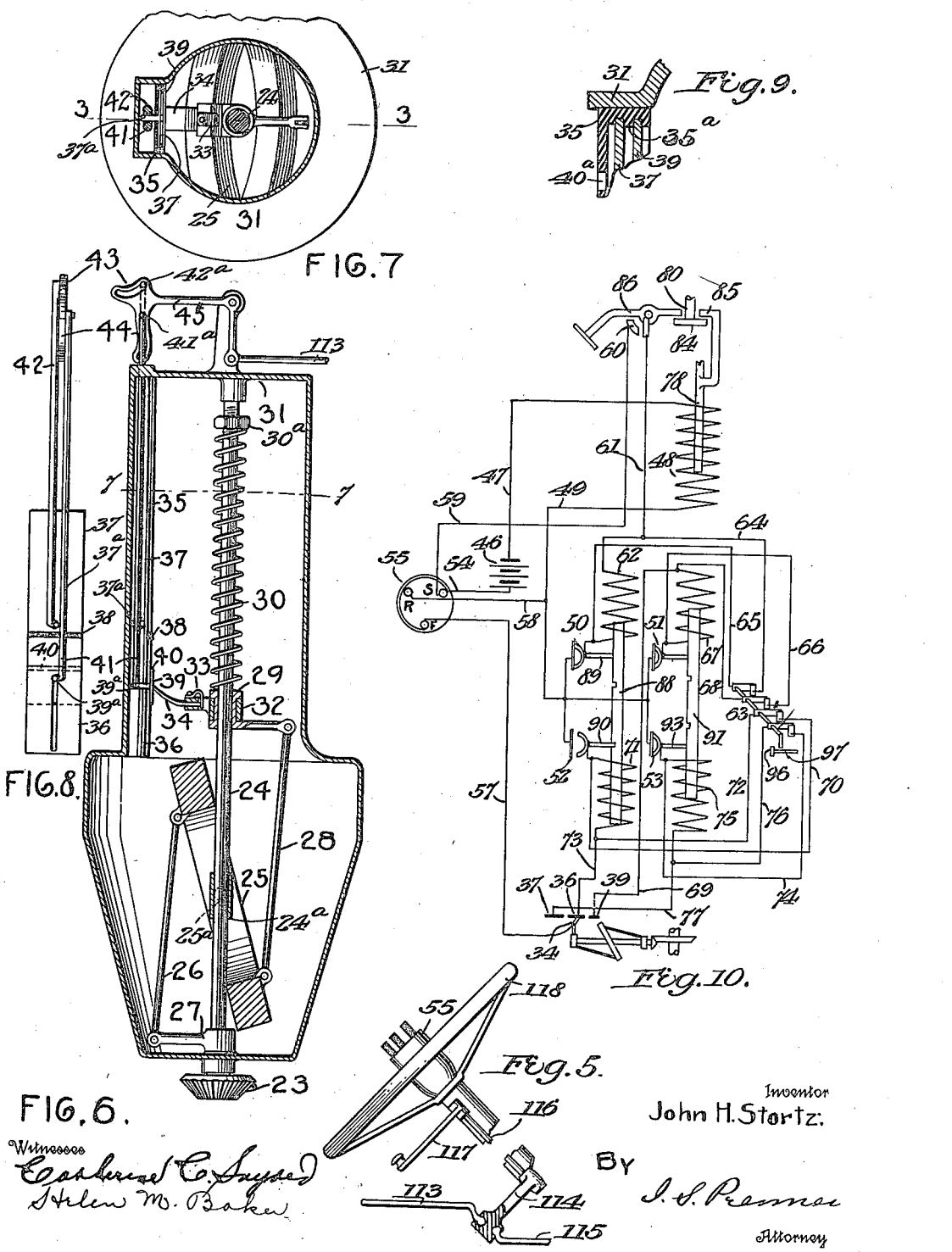

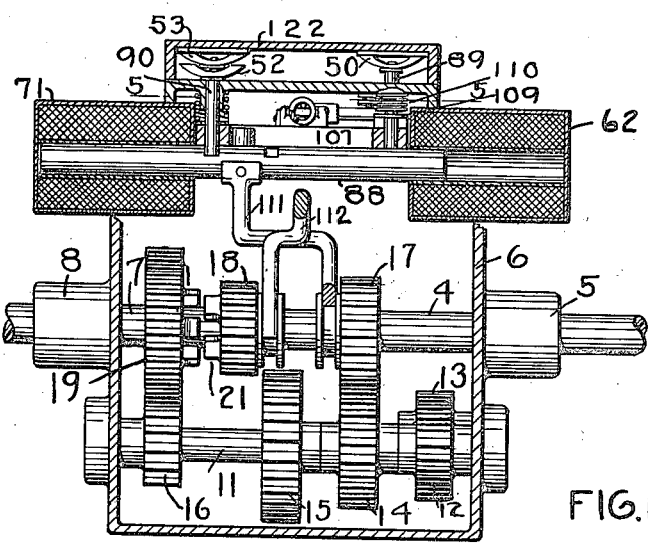

UNITED STATES PATENT OFFICE.

JOHN H. STORTZ, OF PHILADELPHIA, PENNSYLVANIA.

SPEED-SELECTOR.

1,209,352.

Specification of Letters Patent.

Patented Dec. 19, 1916.

Application filed December 2, 1913. Serial No. 804,170.

*To all whom it may concern:*

Be it known that I, JOHN H. STORTZ, a citizen of the United States, and a resident of Philadelphia, in the county of Philadelphia and State of Pennsylvania, have invented certain new and useful Improvements in Speed-Selectors, of which the following is a specification.

This invention relates to automatic speed changing devices for power driven machines, and particularly adapted in connection with the transmission gearing of self propelled vehicles, such as automobiles and the like, and when so applied insures an economical and efficient performance of the prime mover in overcoming the different resistances, automatically manipulates the relative speeds of the prime mover and machine under all conditions of operation.

One of the objects of this invention is to provide a speed selecting device, wherein the motive power of the prime mover is utilized to produce an automatic change in the speed of the machine in proportion to its load; that is, should a heavy load be thrown on the machine when it is geared to run at a high speed, as in the case of an automobile striking a heavy grade, the speed selector will immediately cause a shifting of the gears from that of the high speed gear to a lower speed gear, so that if its motive power is insufficient to carry its load at the high speed, it will be enabled to carry it at the lower speed; on the other hand, should the motive power be in excess of the load, the speed selector will immediately produce a shifting in the gearing to allow the machine to run on a higher speed gear; should the motive power be varied in proportion with the load, the speed selector will prevent a shifting of the gearing, and permit the machine to operate at a constant speed.

Another object of this invention is to provide a simple, efficient, and reliable automatic speed changing mechanism, which will cause the transmitting mechanism to produce the proper speed relations between the driving and driven means of a machine, under all conditions of operation, without any attention of the operator.

A further object of this invention is to provide means whereby a power driven machine may be made to start, stop and reverse by manipulating a three-button switch of an electric circuit so that a pressure on one of the buttons will start the car ahead at the most convenient low speed and permit it to pick up its running speed automatically, a pressure on a second button will bring the car to a stop, and a pressure on a third button will reverse the car.

To the accomplishment of the recited objects and others coördinate therewith, my invention comprises the method and means hereinafter described, a preferred embodiment whereof resides in the construction, combination and the arrangement of parts illustrated in the accompanying drawings, and embraced within the scope of the appended claims.

In the said drawings:—Figure 1 is a fragmentary side elevation of an automobile provided with my improvements; Fig. 2 is a plan view of the three-point switch in connection therewith; Fig. 3 is a section on the line 1—1 of Fig. 2; Fig. 4 is a side elevation of Fig. 3 partly broken open; Fig. 5 is a broken view partly in section of the steering wheel and power controller in connection therewith; Fig. 6 is a section on the line 3—3 of Fig. 7; Fig. 7 is an enlarged section on the line 2—2 of Fig. 1 corresponding with a section on the line 7—7 of Fig. 6; Fig. 8 is a plan view of sliding contact makers in connection therewith; Fig. 9 is an enlarged fragment of Fig. 7; Fig. 10 is a diagrammatic view of electromagnetic circuits in connection therewith; Fig. 11 is an enlarged section of a gear box shown in Fig. 1; Fig. 12 is a section on the line 13—13 of Fig. 13, and Fig. 13 is a section on the line 12—12 of Fig. 12.

Referring more particularly to the drawings for a detail description of my invention, 1 indicates a fly wheel mounted on a power shaft 2, which is assumed to be driven by a gasolene motor (not shown) or may be driven from any other source of power, and 3 represents a clutch, which is normally held by the fly wheel but is adapted to be removed therefrom. The clutch is slidingly keyed on the shaft 4, supported by a bearing 5 of a gear chest 6. A shaft 7 mounted in said gear chest is supported by a bearing 8 thereof in alinement with said shaft 4. The shaft 7 is universally coupled with a shaft 9 adapted to drive the axle 10 by means of the ordinary differential gearing (not shown). In the gear chest 6 is mounted a counter-shaft 11.

On the shaft 11 are fixedly mounted a pinion 12 in mesh with an idler 13, and pinions 14, 15 and 16. On the shaft 4 is slidingly keyed a gear 17 which is adapted to mesh with either the pinion 14 or pinion 13, and a gear 18 adapted to mesh with the pinion 15 or to be coupled with a gear 19, fixedly mounted on the shaft 7, by means of the recessed shoulder 20 of the gear 19 and the wedges 21 of the gear 18.

On the shaft 7 is fixedly mounted a bevel gear 22 in mesh with a similar gear 23. The gear 23 is fixedly mounted on a spindle 24 (Fig. 6). On said spindle 24 is slidingly mounted a sleeve 24$^a$, carrying pins 25$^a$ and swingingly supporting an annular weight 25. The weight 25 is pivotally connected by a rod 26 with the arm of a collar 27 which is fixedly mounted on said spindle 24, and by a rod 28 with the arm of a sleeve 29 which is slidingly keyed on said spindle. The sleeve 29 is connected with one end of a spring coil 30, whose opposite end is connected with a hexagonal collar 30$^a$ adjustably carried by the spindle inside the housing 31. The sleeve 29 is provided with a bearing for a collar 32. The collar 32 is provided with a recessed lug for the foot of a flexible switch-member 34, which is supported therein by means of feather-spring 33.

Inside the housing 31 is vertically mounted an insulator provided with grooved sides 35, slidingly supporting the switch-members 36 and 37 which are in alinement and are rigidly joined by an insulator 38. In front of the member 36, and separated therefrom by the projected portion 35$^a$ of the insulator 35, is slidingly mounted the member 39 which is provided with an insulator 40. The insulators 38 and 40 are slightly projected outwardly, each being adapted to intercept the member 34. When the member 34 is forced by the movement of the weight 25 successively across the members 40 and 38 it breaks contact with one of the slides and makes contact with another slide. The slide-member 37 is centrally provided with an arm 37$^a$, and the slide-member 39 is similarly provided with an arm 39$^a$ which is projected through a central longitudinal slot of the member 36. Said arms 37$^a$ and 39$^a$ are projected through a longitudinal slot 40$^a$ of the insulator 35. The arm of the slide 39 is pivotally connected with one end of a rod 41 which is provided with a roller 41$^a$ mounted in a cam 44, and the arm of the slide 37 is similarly connected with one end of a rod 42 which is provided with a roller 42$^a$ mounted in a cam 43. The cams 43 and 44 are integral with a bell crank 45 pivoted on a bracket on top of the housing 31.

The cam 43 is in the form of a slot bounded by a curved path for the roller 42$^a$ carried by the rod 42 and is adapted to cause said rod to move in a straight line. The cam 44 is in the form of a slot bounded by a path of two opposite curvatures for the roller 41$^a$ of the rod 41, the upper portion of the cam being adapted to move over the roller of the rod 41 without transmitting any motion to said rod during the movement of the rod 42, and the lower portion of said cam being adapted to cause the roller 41 to move parallel with the rod 42. The movement of the rod 41 is transmitted to the slide of the member 39, and the movement of the rod 42 is transmitted to the slide of the members 36 and 37.

A source of electricity 46 has one of its terminals connected by a conductor 47 with a terminal of a solenoid 48 whose opposite terminal is connected by a conductor 49 with the terminals of switch members 50, 51, 52 and 53. The opposite terminal of the source 46 is connected by a conductor 54 with a three-point button switch 55. One of the three opposing terminals of the switch 55 is connected by a conductor 57 with the switch member 34, a second one of said terminals is connected by a conductor 58 with the conductor 49, and the third one of said terminals is connected by a conductor 59 with the stationary member of a switch 60 whose opposite member is carried by a pedal 86 and is connected by a conductor 61 with one terminal of a solenoid 62. The opposite terminal of the solenoid 62 is connected with the switch member opposite to the switch member 50. Said solenoid 62 is shunted through a blade of a four-point knife switch 63 by conductors 64 and 65. A solenoid 67 is shunted by conductors 66 and 68 through a second blade of the switch 63 and has one of its terminals connected to the switch-member opposite to the member 51 and its second terminal is connected by a conductor 69 with the slide member 39. A solenoid 71 is shunted by conductors 70 and 72 through a third blade of the switch 63, and has one of its terminals connected to the switch-member opposite to the member 52 and its second terminal is connected by a conductor 73 with the slide member 36. A solenoid 75 is shunted by conductors 74 and 76 through the fourth blade of the switch 63, and has one of its terminals connected with the switch-member opposite to the member 53 and its second terminal is connected by a conductor 77 with the slide member 37.

The solenoid 48 is adapted to magnetize a core 78 which is connected, through a dash-pot 79, with the arm of an L-shaped lever 80 of the second class, whose leg is pivoted on a bracket 81 mounted on the frame 82. The lever 80 passes through the annular recess of a collar 83 keyed on the shaft 4 which is adapted to move the clutch 3 along said shaft. The arm of the lever 80 is provided with a flange 84 whereby it is adapted to be operated by the arm of the pedal 86 which is fulcrumed on a bracket 87 mounted on the frame to move the clutch away from the fly wheel.

The solenoids 62 and 71 are provided with a plunger 88 having notches for the feet of the studs 89 and 90 which carry the switch members opposite the switch members 50 and 52. The solenoids 67 and 75 are similarly provided with a plunger 91 having notches for the studs 92 and 93 which carry the switch members opposite the members 51 and 53.

The knife-blades of the switch 63 are mounted on a rock-shaft 94 which is insulated therefrom and is provided with an arm adapted to be acted upon by the spring coil 95 to close the switch, and to be acted upon by a shoulder 96 of a rod 97 to open the switch. The rod 97 is slidingly projected through the casing 99 mounted on top of the gear chest 6, where it is connected with the slotted arm of a bell crank 98 fulcrumed on a bracket of said casing. The crank 98 is operated by a rod 100 which is pivotally connected with an arm of the core 78 (Fig. 1) above a hook which spans the dash-pot 79 and is adapted to engage the flange 84 of the clutch operating lever 80.

Inside the casing 99 is slidingly mounted a cam-plate 101 which is centrally hooked on the end of a coil spring 102, which is hooked at its opposite end on the casing 99. On the plate 101 is pivoted one end of a trigger 103 provided with a notch for the shoulder 96, and is forced against said flange by a flat spring 104 carried by said plate 101.

The plunger 88 is centrally provided with a vertical pin carrying a roller 105, and the plunger 91 is similarly provided with a pin carrying a roller 106. The cam-plate 101 is provided with cam surfaces 107, one of which serves as a path for the roller 105 and the other for the roller 106. The cam-plate 101 is provided with parallel slots through its elevated surfaces 108 on opposite sides of the cams. The cams 107 of the plate 101 are in the form of slots in alinement, each bounded by sides which meet at a point of the plate 101 midway between the sides of the elevated surfaces 108 sloping thence in the direction of the opposite sides of said elevated surfaces to points whence said elevated surfaces commence to slope, thence parallel with the sides of said elevated surfaces to points below the slopes of said elevated surfaces, thence transversely across the plate, the sides of the cams being joined by curved portions of a radius equal to that of the rollers 105 and 106.

The slots of the elevated surfaces 108 serve as guides for the studs 89, 90, 92 and 93. Each stud is projected through a disk 109 which supports a spring coil 110 wound on each stud under the top of the frame 99 through which the stems are projected, said studs having their tops insulated from the switch members which they carry opposite to the switch-members 50, 51, 52 and 53 suspended from the top frame 122.

A gear shifter 111 is connected at one end with the plunger 88 and terminates in a recess of the gear 17, a similar shifter 112 is connected on to the plunger 91 and terminates in a recess of the gear 18.

The bell crank 45 of the cams 43 and 44 is operated by a rod 113 which has a socket-joint connection with an arm 114. The arm 114 is mounted on a power-controller shaft 116 adapted to be operated by a crank handle 117 under the steering wheel 118, said arm 114 having also a socket-joint connection with a rod 115 adapted to operate the throttle (not shown).

The three-point switch 55 is in the form of a cylindrical box centrally provided with a lug 119, the top of which is provided with a recess wherein is pivoted a central projection of a disk 120. The lug 119 is insulated from the bottom of the box. On the bottom of the box are mounted and insulated therefrom the terminals of the conductors 57, 58 and 59, which terminals are separated by the insulators 125, said terminals and insulators lying in the angles of a regular hexagon. The disk 120 constitutes the terminal of the conductor 54, and is pivotally connected with the insulated caps marked F, S, and R. Each cap is projected through a perforation of the top of the box, and is provided with recesses one above the other adapted to be gripped by the rim of its perforation, whence it may be forced out by pressure of a finger of the hand of the operator.

The frame 99 is provided with a shoulder 123 adapted to cause the trigger 103 to release the lug 96.

The operation of a vehicle provided with the above described apparatus is as follows:—Assuming that the button marked F, which indicates that the car is to run ahead, is depressed as shown in Fig. 3, then the terminal of the conductor 54 is connected with the terminal of the conductor 57 through the disk 120. The circuits, as shown in Fig. 10 are as follows:—The circuit through the solenoids 48 and 71 is broken by the switch-member 52, and the other circuits are broken by the caps marked R and S, by the slide-members 39 and 37 and by the pedal-switch 86. As there is no current through the solenoid 48, its core 78 is demagnetized and the clutch 3 is forced by the spring 3ª to connect the shaft 4 with the power shaft 1. The motion of the power shaft is transmitted by the shaft 4 and its gear 17 which, as shown in Fig. 11 is in mesh with the pinion 14, to the counter shaft 11, thence by the pinion 16 mounted on said counter shaft and the gear 19 with which it is shown to be in mesh to the shaft 7. The shaft 9, shown in Fig. 1, which is coupled with the shaft 7, transmits the motion to the driving axle 10 in the ordinary manner. When the gear 17 is in mesh with the pinion 14, the car is assumed to be running ahead on its intermediate or second speed.

To bring the car to a stop the button marked S, which is intended for stop, is depressed with sufficient force to force its lower recess off the rim of its perforation of the top of the switch 55. This causes the disk 120 to swing on the post 119 and across an insulator 125, which breaks the connections between the terminals of the conductors 54 and 57 and prevents the making of any other connections. When the upper recess of said button is in alinement with the rim of its perforation, the lower recesses of the other two buttons are gripped by the rims of their corresponding perforations to prevent the spontaneous movements of the buttons, and the terminal of the conductor 54 is in metallic connection with the terminal of the conductor 58. This establishes a circuit through the solenoid 48, which magnetizes the core 78 whereby it is pulled inwardly by its said solenoid.

The inward movement of the core 78 causes its hook to press on the flange 84 of the lever 80, whereby it is made to swing in the direction of the core. This causes the collar 83 to slide on the shaft 4, whereby the clutch is pulled away from the fly wheel and no power is transmitted to the driving axle. As the car is now slowing down, no motion is transmitted to the shaft 7, and the spindle 24 which is driven by the gear 23 thereof in mesh with the gear 22 of said shaft 7 slows down. This permits the weight 25 to assume the position shown in Fig. 6. The connecting rod 28 forces down the collar 32 and brings the switch member 34 to the position therein shown, and in contact with the slide member 39. The movement of the core 78 is also transmitted by the rod 100 to the bell crank 98 to cause its slotted arm to move in a direction away from the frame 99. This pulls the rod 97 outwardly, with its lug 96 in the recess of the trigger 103 mounted on the plate 101, as shown in Fig. 12, and causes said plate to slide in the direction of the rod 97. This movement of the plate forces the disks 109, shown in Figs. 11 and 13, up the inclines and on top of the elevations 108, whereby the stud 90 is lifted out of its recess or notch of the plunger or core 88 and said plunger is thereby released. After the plunger 88 has been released, one of the inclined surfaces of the cams 107 bears on the roller 105, whereby said plunger is moved to a position centrally between the solenoids 62 and 71. This causes the shifter 111 to force the gear 17 out of mesh with the pinion 14. The outward movement of the rod 97 causes the lug 96 to press on the crank arm of the shaft 94 which opens the switch 63, and the movement of the plate 101 causes the trigger 103 to bear against the shoulder 123 of the frame 99 whereby said trigger releases the lug 96, and the plate 101 is then free to be pulled back to its original position by the spring 102.

To start the car ahead, the button marked F is depressed until its upper recess is gripped by the rim of the perforation in alinement therewith. This establishes a circuit from the source 46 by way of conductor 47 through the solenoid 48, thence by way of conductor 49 through the switch of the member 51 through the solenoid 67, thence by conductor 69 to the slide member 39 of the speed selector switch shown in Fig. 6, which is now in contact with the member 34, thence by the conductor 57 to its terminal in the switch 55, thence by way of the disk 120 to the terminal of the conductor 54 connected therewith, which completes the circuit with the source 46. As the solenoid 67 is now in series with the solenoid 48, the clutch is disconnected from the fly-wheel while the plunger 91 is pulled inwardly by the solenoid 67. This causes the shifter 112 to slide the gear 18 on the shaft 4 until it is in mesh with the large pinion 15 adapted to start the car on its lowest or first speed. As the plunger 91 is pulled inwardly one of its notches is brought under the stud 92, and its spring shown in Fig. 13 causes it to drop in the notch thereunder whereby the switch of the member 51 is opened. This breaks the circuit of the solenoid 48, and the core 78 is demagnetized which permits the clutch to move into the fly wheel. The inward movement of the clutch causes the lever 80 to swing in its vertical position, whereby the flange 84 presses on the hook of the core 78 and causes it to move outwardly. The rod 100 transmits this motion to the bell crank 98 causing its slotted arm to swing in the direction of the frame 99 and to push the rod 97 inwardly. This releases the arm of the shaft 94, and the spring 95 causes the switch 63 to close. The closing of the switch 63 shunts the solenoid 67, whereby the plunger 91 is demagnetized. The inward movement of the rod 97 causes its lug 96 to slide along the trigger 103 until it gets within the notch of said trigger.

If the controller handle 117 is now turned to give the car sufficient power to run at a normally high speed for a level road, the car will start on its lowest speed gear, and as it picks up its speed, the speed selector spindle 24 will rotate at an increasingly high speed and cause the weight 25 to swing. This movement will be transmitted by the rod 28 to slide the sleeve 29 upwardly on the spindle, which will cause the member 34 to slide along the slide member 39 until it is snapped across the insulation 40 and to make contact with the member 36. A circuit is now established through the solenoid 48, by way of the switch of the member 52, through the conductors 70 and 72, by way of a blade of the switch 63 which is closed by the spring 95, which shunts the solenoid 71, completing the circuit through the members 36 and 34 of the speed selector switch. The current through the solenoid 48, due to the above circuit, produces a pull on the core 78. The pull on the core 78 pulls the clutch and the rod 97 outwardly, and this outward movement of the rod 97, causes the cam-plate 101 to slide whereby the stud 92 is lifted out of its notch of the plunger 91 and the plunger is then moved centrally between the solenoids 67 and 75 by an inclined surface of the lower cam of the plate moving over the roller 106. This movement of the plunger 91 causes its shifter 112 to force the gear 18 out of mesh with the pinion 15 to the position shown in Fig. 11. The outward movement of the rod 97 also opens the switch 63. This results in a current through the solenoid 71 which is now in series with the solenoid 48. As the trigger was in the meantime forced away from the lug 96 by its movement over the shoulder 123 of the frame 99, the plate 101 is pulled back to its original position by its spring 102. The plunger 88 is now free to be pulled in by the current carrying solenoid 71, and its shifter 111 forces the gear 17 in mesh with the pinion 14 to run the machine on its second speed. As the pulling in of the plunger 88 brings one of its notches under the stud 90, said stud is forced down therein by the spring thereon, whereby the switch of the member 52 is opened and the circuit through the solenoid 48 is broken. This demagnetizes the core 78 and results in the clutch connecting with the fly wheel the closing of the switch 63 and in the lug 96 moving into the notch of the trigger 103. The car is now running on its second speed, and as it picks up the spindle 24 is rotated at a higher speed and causes the weight to swing sufficiently to force the collar 29 farther up. This causes the member 34 to snap across the insulation 38 and to make contact with the member 37.

The contact between the selector members 34 and 37 establishes a circuit for the solenoid 48 by way of the shunt conductors 74 and 76. This causes the clutch to become disconnected from the fly wheel, the stud 90 to be lifted out of its notch on the plunger 88, the plunger to be moved centrally between the solenoids 62 and 71, the gear 17 to be forced out of mesh with the pinion 14, and the switch 63 to open. The opening of the switch 63 permits a current to pass through the solenoid 75 in series with the solenoid 48. This holds the clutch open until the plunger 91 is pulled in by the solenoid 75 to cause its shifter 112 to force the gear 18 in the direction of the gear 19 until the wedges 21 are within the recesses 20. As the plunger 91 is pulled in by the solenoid 75, the stud 93 is forced within a notch of the plunger and opens the switch of the member 53. This breaks the circuit of the solenoid 48, which permits the clutch to connect with the fly wheel and the car is ready to run at the speed of the power shaft.

To reverse the car, the button marked R is depressed, and the switch 60 is closed by the foot lever 86. This establishes a circuit by way of conductor 54, disk 120, conductor 59, switch 60, conductor 61, shunt conductors 64 and 65 of solenoid 62, switch of member 50, conductor 49, solenoid 48, conductor 47 and source 46. This disconnects the clutch from the fly wheel, forces the particular speed gears out of mesh if the car is reversed while in motion, and opens the switch 63. This connects the solenoid 62 in series with the solenoid 48 and pulls in the solenoid 88 while the clutch is disconnected. This pulling in of the plunger 88 causes the stud 89 to drop within a notch thereof, while the shifter 111 forces the gear 17 in mesh with the idler 13. The dropping of the stud 89, opens the switch of the member 50 and cuts the solenoid 48 out of circuit. The clutch is now free to connect with the fly wheel to run the car in a reversed direction.

To illustrate further the operation of the speed selector, it is assumed that the machine is started with just enough power to run on the first or lowest speed. This would bring the slide 39 in contact with the member 34 slightly below the insulator 40. If the controller handle 117 is now turned to increase the power, the movement is transmitted by means of the shaft 116, the arm 114 and the rod 113 to the bell crank 45. The cam 44 will pull on the rod 41 to urge the slide 39 upwardly, while the increased speed will urge the member 34 upwardly to continue in contact with said slide. The cam 43 will pull on the rod 42 to urge the slides 36 and 37 upwardly. This will result in a change of the range of speeds, for the reason that the speed selector will thereby be adapted to allow the car to pick up a relatively higher speed before it is thrown over on its second speed, and to pick a relatively higher second speed before it is thrown over on its third speed.

Should the machine strike a heavy grade while it is on the third speed, the speed selector will automatically bring it down to its second speed, provided the power handle has not been turned. If however the controller handle is turned so as to give the machine more power, the speed selector will prevent the change to a lower speed.

It should be understood that, in its broader aspect, my invention comprehends the employment not only of the various means described, but of equivalent means for performing the recited functions. While the arrangement shown is thought, at the present time, to be preferable, it is desired to reserve the right to effect such modifications and variations thereof as may come fairly within the scope of the appended claims.

What I claim as new and desire to protect by Letters Patent, is—

1. In combination with a power driven machine provided with speed changing devices, an electromagnet adapted to operate each of said devices, and a switch adapted to close and to open the circuit of each electromagnet, said switch comprising relatively movable members, the movement of one of said members depending upon the speed of the machine.

2. In combination with a power driven machine provided with speed changing devices and with a power controller, an electromagnet adapted to operate each of said devices, and a switch adapted to close and to open the circuit of each magnet comprising relatively movable members, one of said members depending for its movement upon the speed of the machine, and a second member depending for its movement upon that of the controller.

3. In combination with a power driven machine provided with speed changing devices and with a power controller, an electromagnet adapted to operate each of said devices, and a switch adapted to control the current of each electromagnet comprising a member operatively connected with the machine and a member operatively connected with the controller.

4. In combination with a power driven machine provided with speed changing devices and with a power controller, an electromagnet adapted to operate each speed changing device, and a switch adapted to control the circuits of said magnets, said switch comprising a member common to all the circuits and a plurality of members corresponding with the number of circuits, said common member operatively connected with the machine, and said plurality of members operatively connected with the controller.

5. In combination with a power driven machine provided with speed changing devices, electromagnets adapted to operate said devices, a source of electric power, a switch adapted to connect each magnet with the source, and a switch adapted to open the circuit of one of the magnets independently of any of the other magnets.

6. In combination with a power driven machine provided with speed changing devices, electromagnets adapted to operate said devices, a source of electric power, a switch adapted to connect each magnet with the source, and a switch adapted to short circuit said magnets.

7. In combination with a power driven machine provided with speed changing devices, electromagnets adapted to operate said devices, a source of electric power, a switch adapted to connect each magnet with the source, a switch adapted to short circuit said magnets, and a switch adapted to open the circuit of each magnet.

8. In combination with a power driven machine provided with a clutch and with speed changing devices, said clutch being normally adapted to transmit power to the machine, an electromagnet adapted to open the clutch, a series of electromagnets adapted to operate the speed changing devices, a source of electric power, a switch adapted to connect each of the series of magnets with the source, a switch adapted to connect the clutch magnet in series with each of the series of magnets, and a switch adapted to short circuit each of said series of magnets.

9. In combination with a power driven machine provided with a driving, transmitting and driven shafts, a clutch normally adapted to connect the driving and transmitting shafts and speed changing devices each normally adapted to disconnect the transmitting and driven shafts, an electromagnet adapted to operate the clutch to disconnect the transmitting shaft from the driving shaft, a series of electromagnets each adapted to operate a speed changing device to connect the transmitting shaft with the driven shaft, a source of electric power, a switch adapted to connect each of the series of magnets with the source, a switch adapted to connect the clutch magnet in series with the series magnets, and a switch adapted to short circuit the series of magnets.

10. In combination with a power driven machine provided with driving, transmitting and driven means, a clutch normally adapted to connect the transmitting with the driving means, speed changing devices normally adapted to disconnect the transmitting and driven means, an electromagnet adapted to disconnect the transmitting and driving means, electromagnets adapted to connect the transmitting and driven means, a source of electric power, a switch adapted to connect said magnets in series with the source, a switch normally adapted to connect the disconnecting magnet with the connecting magnets, and a switch normally adapted to short circuit the connecting magnets.

11. In combination with a power driven machine provided with starting, stopping and reversing means, electromagnets adapted to operate said means, a source of electric power, and manually operative switches adapted to connect each magnet in circuit with the source.

12. In combination with a power driven machine, electromagnets adapted to start, stop and reverse the machine, a source of electric power, a speed selecting switch adapted to connect and disconnect said magnets successively in circuit with the source, and a manually operated switch interposed between said selecting switch and the reversing magnet.

13. In combination with a power driven machine adapted to be operated in opposite directions, an electromagnet adapted to disconnect the machine before its direction is changed, electromagnets adapted to connect the machine to run in said opposite directions after said disconnection, a source of electric power, a switch between the source and the connecting magnets, a switch between the source and the reversing magnet, a switch adapted to short circuit the connecting magnets, a switch adapted to connect the disconnecting magnet in series with the connecting magnets, and a speed selecting switch adapted to cause the closing of the circuit of the disconnecting magnet, connecting the disconnecting magnet in series with a connecting magnet, and then to cut both of said magnets out of the circuit.

14. In combination with a machine provided with driving, transmitting and driven means, an electromagnet adapted to disconnect the transmitting from the driving means, and a shifter actuated by said magnet adapted to disconnect the transmitting and driven means.

15. In combination with a machine provided with driving, transmitting and driven means, an electromagnet adapted to successively disconnect the driving, transmitting means, and to release means whereby an interchange of connections between the transmitting and driven means may be accomplished, and an electromagnet adapted to interchangeably connect the transmitting with the driven means.

16. In combination with a machine provided with driving, transmitting and driven means, an electromagnet provided with a plunger adapted to disconnect the transmitting and driving means, a shunted electromagnet provided with a plunger adapted to connect the transmitting with the driven means in series with the disconnecting electromagnet, the plunger of the disconnecting electromagnet adapted to open the shunt of the connecting electromagnet, and the plunger of said connecting electromagnet adapted to break the circuit between said magnets.

17. In combination with a machine provided with driving, transmitting and driven means, an electromagnet adapted to disconnect the transmitting and driving means, an electromagnet adapted to connect the transmitting with the driven means, means for locking the transmitting and driven means in their connected position, and means operated by the disconnecting magnet to release the locking means.

18. In combination with a machine provided with speed changing devices, electromagnets adapted to operate said devices, a source of electric power, and a speed selector adapted to connect the source with said magnets comprising a mechanically movable member connected with the source and manually movable members connected with the magnets.

19. In combination with a machine provided with speed changing devices, electromagnets adapted to operate said devices, a source of electric power, and a speed selector comprising a member connected with the source and a plurality of members each connected with one of the magnets, a spindle yieldably supporting the source member, and a weight movably supported by said spindle and operatively connected with the source member.

20. In combination with a machine provided with speed changing devices, electromagnets adapted to operate said devices, a source of electric power, a speed selector comprising a switch consisting of a member connected with the source and a plurality of members connected with the magnets and a weight adapted to move the source member, and a bell crank adapted to move the magnet members.

21. In combination with a machine provided with speed changing devices, electromagnets adapted to operate said devices, a speed selector, a source of electric power, said speed selector comprising a switch adapted to connect the magnets with the source, a weight adapted to move one member of the switch successively in contact with the members of the magnets and a bell crank adapted to move said magnet members, said crank having an arm provided with cams, and rods operatively connecting the cams with the magnet members.

22. In combination with a power driven machine provided with speed changing devices, electromagnets adapted to operate said devices, a source of electric power, and a speed selector provided with mechanically movable means adapted to connect successively the source in circuit with the magnets.

23. In combination with a power driven machine provided with speed changing devices, electromagnets adapted to operate said devices, a source of electric power, a speed selecting switch connecting the source with the magnets, said switch comprising a mechanically movable member and manually movable members, and a swingingly supported weight operatively connected with the mechanically movable member.

24. In a machine, speed changing gears, shifters for said gears, a roller carried by each shifter, a plate adapted to operate the shifters to move the gears out of mesh and provided with cam surfaces for the rollers, an electromagnet operatively connected with the plate, and electromagnets operatively connected with the shifters.

25. In a machine, speed changing gears, shifters for said gears, studs adapted to lock the shifters, a plate carrying the studs and provided with cams adapted to cause the studs to release the shifters and an electromagnet operatively connected with the plate.

26. In a machine, speed changing gears, shifters for said gears, each shifter provided with notches and with a roller between the notches, studs adapted to enter the notches, a plate provided with cams for the studs and rollers, and an electromagnet adapted to move the plate.

27. In a machine a power shaft, clutch and speed changing gears, shifters for said gears, electro-magnets to operate said shifters, a speed selector adapted to manipulate the electro-magnetic circuits automatically, an electro-magnet adapted to open the clutch during said manipulation, and a switch adapted to open automatically the circuit of said clutch electro-magnet immediately after said manipulation.

28. In a machine, a power shaft, a clutch, speed changing gears, shifters for said gears, electro-magnets adapted to operate the shifters, an electromagnet adapted to open the clutch, a switch adapted to shunt the shifter electro-magnets, switches adapted to connect any one of the shifter electro-magnets in series with the clutch electro-magnet, a speed selector adapted to manipulate the circuits of the various electro-magnets automatically, and a hand switch adapted to close one circuit whereby the machine is started ahead, to close another circuit whereby the machine is reversed and to close a third circuit whereby the machine is stopped.

29. In a machine, a driving shaft, a clutch adapted to connect the machine with the driving shaft, a lever adapted to operate the clutch to disconnect the machine from the driving shaft, an electromagnet provided with a core, and a dashpot yieldably connecting the core with the clutch lever.

30. In a machine, a driving shaft, a clutch normally adapted to connect the machine with the shaft, a lever adapted to open the clutch, a foot pedal adapted to operate the lever, an electromagnetic core adapted to operate the lever to open the clutch independently of the pedal, and a dashpot yieldably connecting the core with the lever.

31. In combination with a machine provided with speed changing devices including shifters, a speed selector comprising a spindle operatively connected with the machine, and a weight movably mounted on the spindle and operatively connected with the shifters of the speed changing devices.

32. In a speed selector, a spindle, an annular weight surrounding said spindle, and means mounted on the spindle and connected with the weight to cause it to participate in the movement of the spindle and to swing during said movement.

33. In a speed selector, a spindle, an annular weight axially surrounding said spindle, and means movably connecting the weight with the spindle adapted to cause the weight to participate in the movement of the spindle and to swing diametrically.

34. In combination with a power driven machine provided with speed-changing devices including shifters, a speed-selector comprising a spindle operatively connected with the machine, and an annular weight slidingly mounted on the spindle and operatively connected with the shifters.

35. In combination with a variable speed machine provided with speed-changing devices including shifters, a speed-selector adapted to establish a selective operative connection between the machine, and its speed-changing devices, and comprising an element adapted to be actuated by the variation of the speed of the machine, and an element operatively connected with the shifters adapted to be actuated by the first above mentioned element.

In testimony whereof I have signed this specification in the presence of two subscribing witnesses.

JOHN H. STORTZ.

Witnesses:
PALMER WATSON,
CATHERINE C. SNYDER.